United States Patent [19]
Fork et al.

[11] 3,932,696
[45] Jan. 13, 1976

[54] UNDERFLOOR ACCESS HOUSING UTILIZING A TROUGH SPACE OF A CELLULAR FLOORING UNIT

[75] Inventors: Frank W. Fork, Allison Park; Robert G. Lindner, Sewickley; Charles J. Kelly, Pittsburgh; Raymond E. Albrecht, Sewickley, all of Pa.

[73] Assignee: H. H. Robertson Company, Pittsburgh, Pa.

[22] Filed: Dec. 26, 1973

[21] Appl. No.: 427,507

[52] U.S. Cl. .................. 174/48; 52/221; 52/232; 169/48
[51] Int. Cl.² .......................................... H02G 3/28
[58] Field of Search ........ 174/48, 49, 65 R; 52/220, 52/221, 1, 232, 317; 220/88 R; 310/88; 252/8.1; 169/48, 49, 46

[56] References Cited
UNITED STATES PATENTS

| | | | |
|---|---|---|---|
| 1,131,399 | 3/1915 | McGinley | 174/65 R |
| 2,279,791 | 4/1942 | Lamb | 169/48 |
| 3,336,153 | 8/1967 | Juda | 220/88 R X |
| 3,592,956 | 7/1971 | Fork | 174/49 |
| 3,609,210 | 9/1971 | Guritz | 174/49 |
| 3,676,568 | 7/1972 | Fork | 174/49 |
| 3,701,837 | 10/1972 | Fork | 174/49 X |
| 3,721,051 | 3/1973 | Fork | 174/49 X |
| 3,728,470 | 4/1973 | Maier | 174/65 R X |
| 3,803,341 | 4/1974 | Klinkman et al. | 174/48 |
| 3,864,883 | 2/1975 | McMarlin | 52/221 |

OTHER PUBLICATIONS
Abrams et al., Fire Tests of Poke-Thru Assemblies (RD008.01B) 1971, Portland Cement Association, Skokie, Illinois.

*Primary Examiner*—Thomas J. Kozma
*Assistant Examiner*—David A. Tone
*Attorney, Agent, or Firm*—Harry B. Keck; George E. Manias

[57] ABSTRACT

An underfloor access housing adapted for use with cellular flooring units of the type normally placed in building floors, and which provide plural cells separated by troughs. The access housing presents a dual outlet opening in its top wall, spans across a trough, and is secured to the crests of adjacent cells. Trough closures positioned on opposite sides of the access housing, enclose a trough space accessible through the dual outlet opening. Cell access openings provided in the webs of the flooring unit establish communication between the cells and the trough space. A partition divides the interiors of the housing and of the trough space into separate compartments, each including one of the cell access openings and one including the dual outlet opening. The partition is adapted to support at least one electrical plug receptacle whereby electrical connections may be made beneath the level of the finished floor. Fireproofing material provided as an unobtrusive layer or layers serve to increase the fire resistance of the access housing.

37 Claims, 35 Drawing Figures

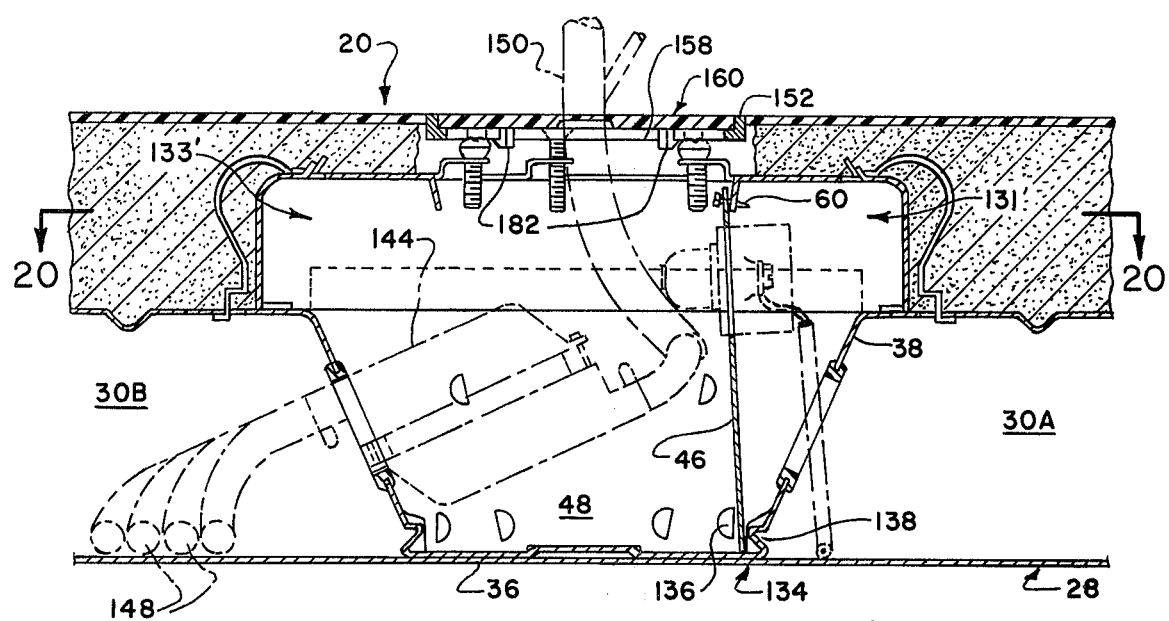
*Fig.19*
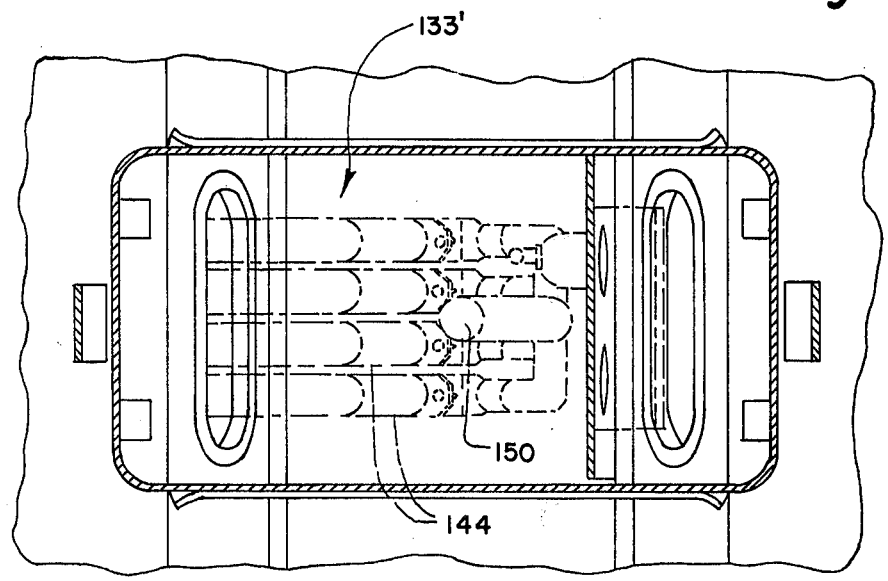
*Fig.20*
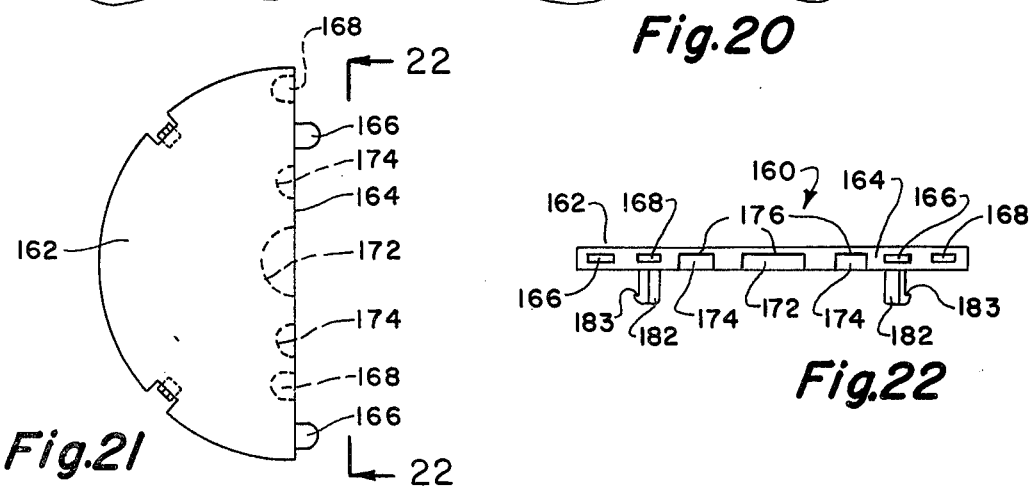
*Fig.21*
*Fig.22*

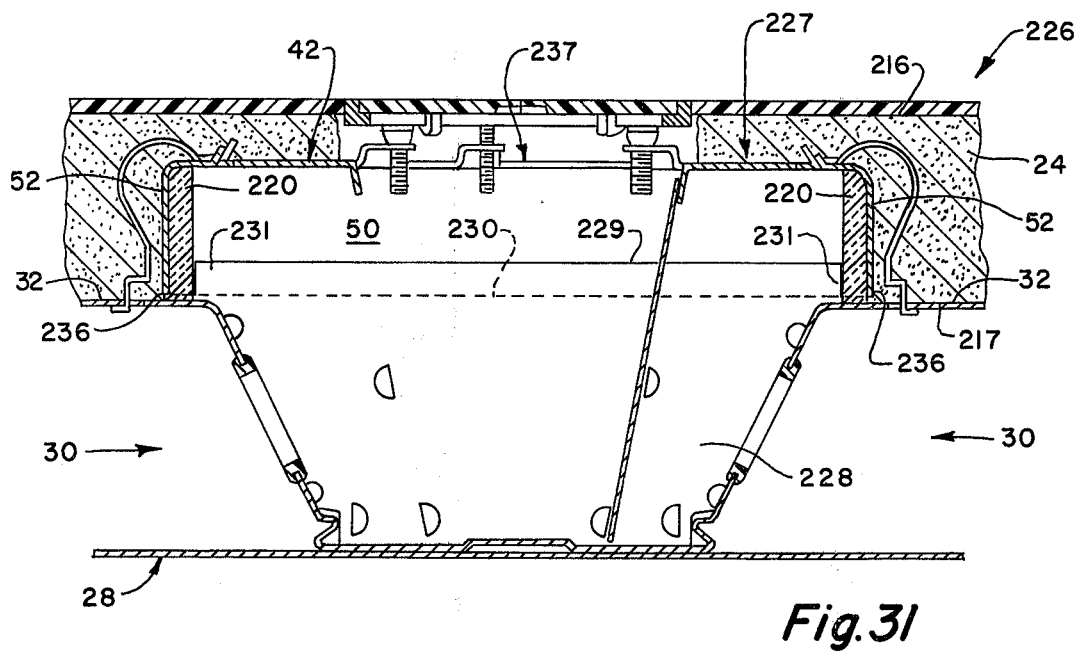
Fig. 31
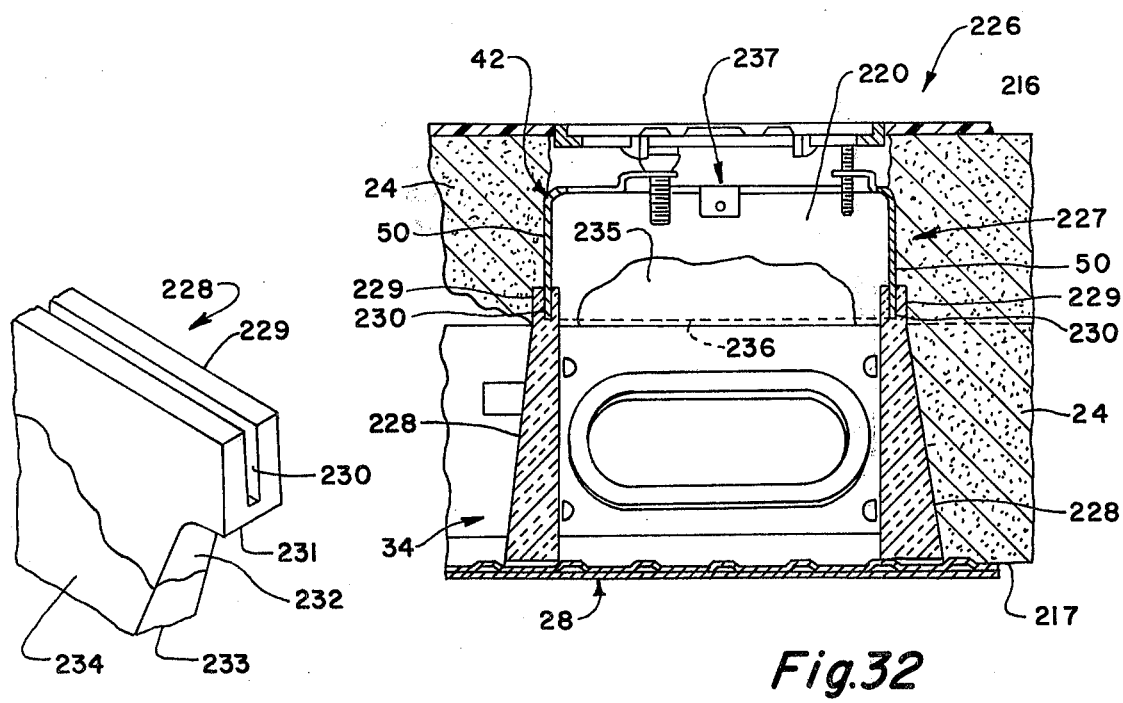
Fig. 33
Fig. 32

UNDERFLOOR ACCESS HOUSING UTILIZING A TROUGH SPACE OF A CELLULAR FLOORING UNIT

BACKGROUND OF THE INVENTION

1. Field of the Invention

This invention relates to an underfloor access housing providing access to a plurality of electrical services at one location in the floor, and more particularly to an improved access housing arrangement which utilizes the trough of a cellular flooring unit.

2. Description of the Prior Art

Numerous types of housings are known in the prior art, which are adapted for use with underfloor cellular flooring units; which span the distance between and communicate with adjoining cells; and which provide access to multiple electrical services.

In one arrangement, the access housing is utilized with a flooring unit having a single crest outlet opening providing access to adjacent cells, see U.S. Pat. Nos. 3,303,264 (SAUL et al., February 1967); 3,751,576 (KLINKMAN et al., August 1973).

In another arrangement, the access housing spans across adjacent cells of the flooring unit. Crest access openings, one for each cell, establish communication with the interior of the access housing. See for example U.S. Pat. Nos. 2,073,490 (LEWIN, March 1937); 3,592,956 (FORK, July 1971); 3,609,210 (GURITZ, September 1971); 3,676,568 (FORK, July 1972); 3,701,837 (FORK, October 1972).

In another arrangement, a housing is provided in the form of a cylindrical base cup which cooperates with confronting openings formed in the confronting webs of a cellular flooring unit. The base cup is adapted to be installed after the concrete has been poured and hardened. That is, an opening is made in the concrete at the preselected location above the electrical raceway. The housing is then inserted into the opening and is secured in place. See U.S. Pat. No. 3,417,191 (FORK, December 1968).

Flooring units having openings in the confronting webs presented in a trough are known in the art. See U.S. Pat. Nos. 3,426,492 and 3,426,802 (FORK, February 1969). A flooring unit with web access openings also is disclosed in copending U.S. patent application Ser. No. 342,478 filed Mar. 19, 1973, which has been abandoned in favor of continuation-in-part of application Ser. No. 489,173 filed July 17, 1974, both assigned to the assignee of the present invention.

SUMMARY OF THE INVENTION

The principal object of this invention is to provide an improved access housing arrangement wherein a trough space of a cellular flooring unit is utilized to house one or more duplex receptacles and one or more telephone cable connectors.

Another object of this invention is to provide an improved access housing arrangement which can be utilized with shallower concrete layers.

Still another object of this invention is to provide an improved access housing arrangement having increased fire resistance.

A further object of this invention is to provide an improved access housing having an improved dual outlet opening arrangement by which through passage is provided for a partition having a minimum passing dimension which is greater than the inner diameter of the dual outlet opening.

The present invention is directed to an access housing arrangement adapted for use in an electrical wiring distributing floor structure of the type including cellular flooring units providing generally parallel enclosed cells. The present access housing arrangement is particularly adapted for use with those metal cellular units having spaced crests separated by relatively wide troughs. Each trough comprises a valley and confronting inclined webs which connect the valley to the spaced crests. An access housing is provided which spans across one trough and has opposite end portions overlying and secured to the spaced crests. The access housing presents upstanding opposite side walls, opposite end walls and a top wall provided with a dual outlet opening.

In accordance with the present invention, distinct trough closures are provided one along each side of the access housing. The trough closures enclose a trough space which is accessible through the dual outlet opening and which contains a valley segment and confronting web segments of the flooring unit. Each of the confronting web segments is provided with a web access opening establishing communication between each cell of the adjacent cells and the trough space. A partition divides the trough space and the housing interior into separate chambers, each containing one of the web access openings, and one containing the dual outlet opening. One or more duplex receptacles supported by the partitions, reside within one of the chambers and are accessible from the other chamber. The other chamber may contain one or more telephone cable connector units.

In the present arrangement, the trough closures are installed in the flooring unit trough. Thereafter the access housing is installed between the trough closures and is secured to the flooring unit. It will be appreciated that by employing distinct trough closures, any one of a plurality of access housings having different lengths and/or heights, may be used.

Further in accordance with the present invention, an access housing is provided wherein the top wall thereof presents notches on opposite sides of the dual outlet opening, each of the notches having an open end at the periphery of the dual outlet opening. The arrangement is such that the notches cooperate with the dual outlet opening to provide through passage for a partition having a minimum passing dimension which is greater than the inner diameter of the dual outlet opening.

The present invention further provides an improved floor structure of the type having a layer of monolithic concrete as the major weight component of the floor structure. The layer of monolithic concrete has an upper surface and a lower surface. A cavity is provided within the layer of monolithic concrete and extends from the upper surface through the lower surface. A quantity of fireproofing material is disposed within the cavity. The fireproofing material has a volume which is a minor fraction of the volume of the cavity. The fireproofing material is adapted to yield, under fire conditions, a stable incombustible mass which seals the cavity against through passage of heat and smoke. The fireproofing material preferably is provided as unobtrusive layer or layers within the cavity. The fireproofing material may be of the type which yields a stable, void filling, glass-ceramic foam.

BRIEF DESCRIPTION OF THE DRAWING(S)

FIG. 19 is a fragmentary cross-sectional view, similar to FIG. 18, illustrating an alternative position for the partition;

FIG. 20 is a cross-sectional view taken along the line 20—20 of FIG. 19, with the concrete removed;

FIG. 21 is a plan view of a cover segment;

FIG. 22 is a side view of the cover segment as viewed from the line 22—22 of FIG. 21;

FIGS. 31 and 32 are cross-sectional views, similar to FIGS. 29 and 30, illustrating a further fireproofing arrangement;

FIG. 33 is a fragmentary isometric view illustrating a portion of a trough closure utilized in the arrangement of FIGS. 31 and 32.

DESCRIPTION OF THE PREFERRED EMBODIMENT(S)

Figure 1:
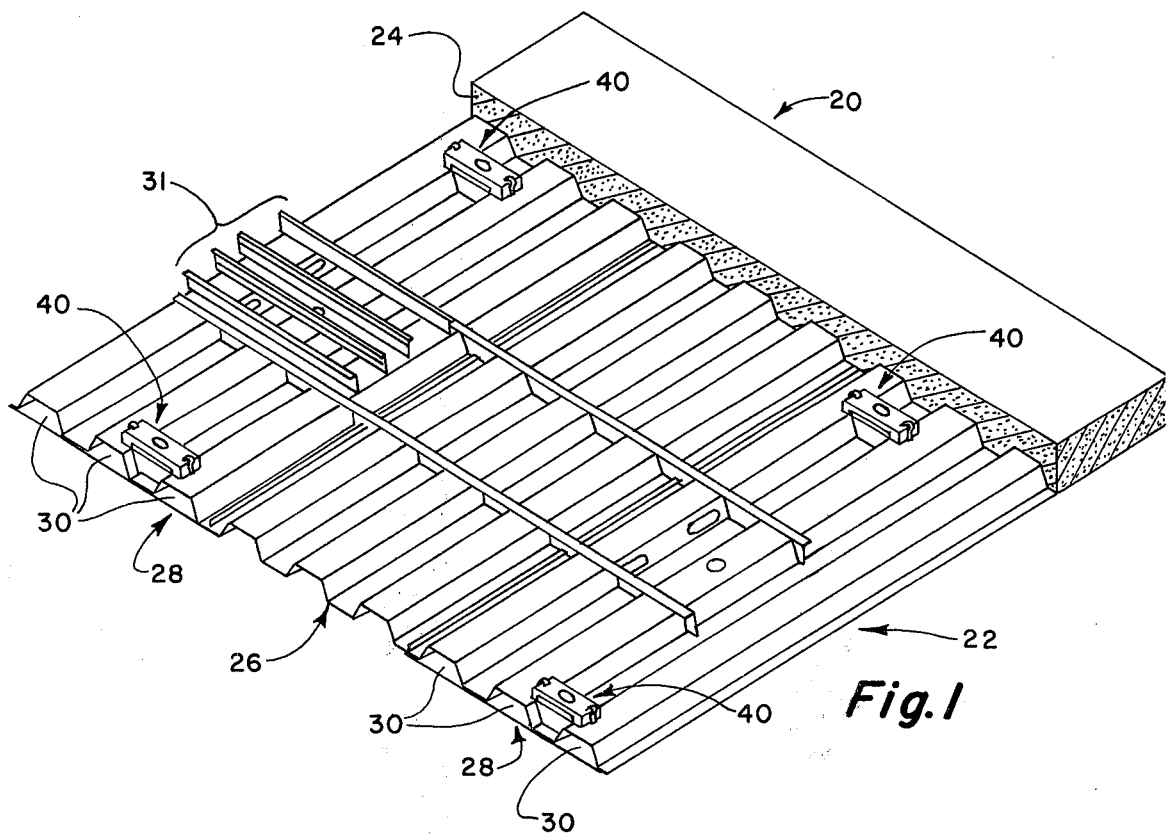
FIG. 1 is an isometric view of a metal subfloor incorporating underfloor access housings of this invention and underfloor electrical trench components.

FIG. 1 illustrates a floor structure 20 comprising a metal subfloor 22 and an overlying layer of concrete 24. The metal subfloor 22 includes sheet metal decking units 26 and metal cellular flooring units 28 which are comingled in a preselected pattern to allow for present and future distribution of electrical services throughout the floor structure 20.

The sheet metal decking units 26 and the metal cellular flooring units 28 may comprise those units disclosed in U.S. Pat. No. 3,812,636 issued May 28, 1974 and assigned to the assignee of the present invention.

The cellular flooring units 28 provide plural, generally parallel, enclosed cells 30 which distribute the electrical wiring of different electrical services throughout the floor structure 20. The floor structure 20 may incorporate an underfloor electrical trench forming assembly, parts of which are illustrated at 31. The trench forming assembly 31 may comprise the assembly disclosed in U.S. Pat. No. 3,721,051 issued Mar. 20, 1973 and assigned to the assignee of the present invention. Reference is also directed to copending application Ser. No. 489,173, supra, for a description of cellular flooring unit useful in combination with the trench forming assembly 31. The trench forming assembly 31 is adapted to distribute the electrical wiring of different electrical services in a direction transversely of the cells 30.

In accordance with the present invention, underfloor access means 40 is provided at selected locations in the metal subfloor 22, prior to pouring the concrete 24. As will be more fully described, each access means 40 provides access to different electrical services at one location in the finished surface of the floor structure 20.

Figure 2:
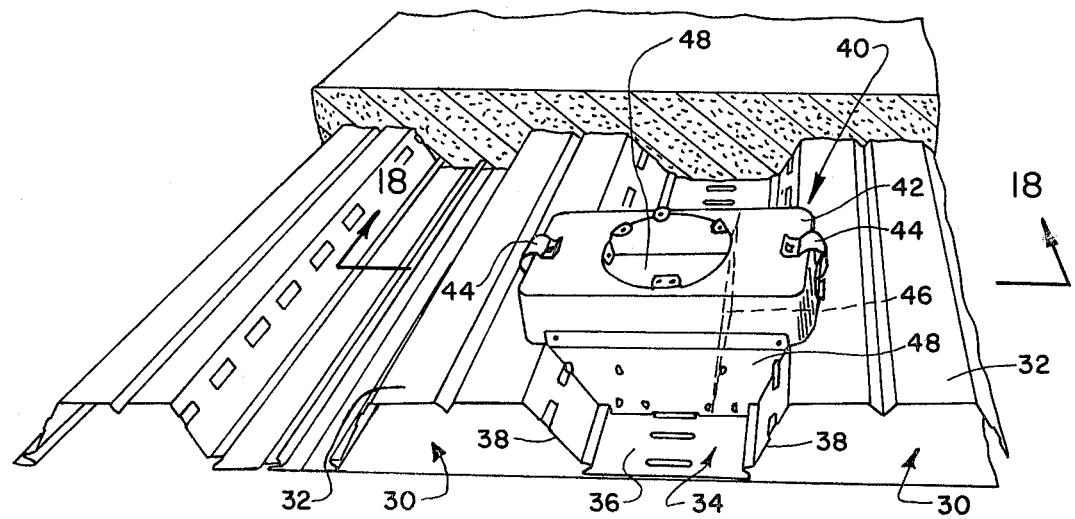
FIG. 2 is a fragmentary perspective view of a cellular flooring unit incorporating an underfloor access housing of this invention.

Referring to FIG. 2, each pair of adjacent cells 30 presents spaced crests 32 separated by a trough 34. Each trough 34 comprises a valley 36 and confronting inclined webs 38 which connect the valley 36 to the spaced crests 32.

The access means 40 comprises, in general, an access housing 42; fastener means, such as hold-down devices 44; at least one partition 46; and trough closures 48.

Figure 3:
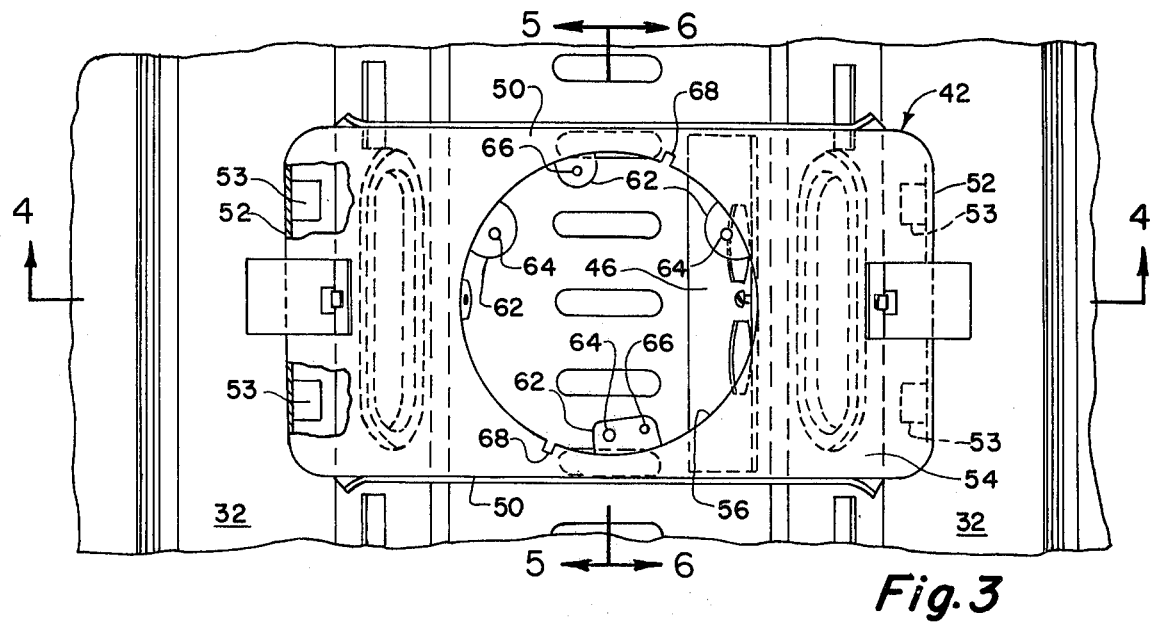
FIG. 3 is a fragmentary plan view of the access housing and flooring unit of FIG. 2.
Figure 4:
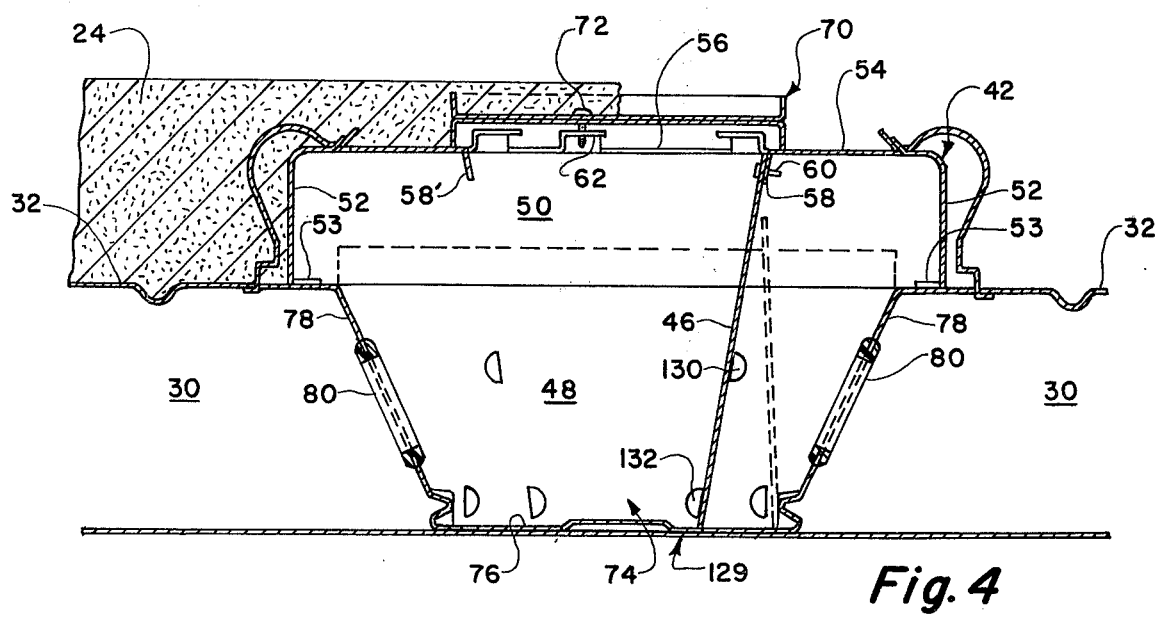
FIG. 4 is a fragmentary cross-sectional view, taken along the line 4—4 of FIG. 3, illustrating the access housing with a closure cap.

Referring to FIGS. 3 and 4, the access housing 42 spans across the trough 34 and has opposite end portions overlying the spaced crests 32. The access housing has an upstanding perimeter wall including opposite side walls 50, opposite end walls 52 having feet 53 overlying the crests 32, and a top wall 54 provided with a dual outlet opening 56. At the perimeter of the dual outlet opening 56, there is provided diametrically opposed downwardly extending tabs 58 (FIG. 4) adapted to receive a partition fastener 60. Also at the perimeter of the dual outlet opening 56, there are provided support ears 62 (FIG. 3), three of which have leveling screw receiving openings 64 and two of which have hold-down screw receiving openings 66. The perimeter of the dual outlet opening 56 also is provided with notches 68 (FIG. 3) which, as will hereinafter be more fully described, provide through passage for the partition 46.

Figure 5:
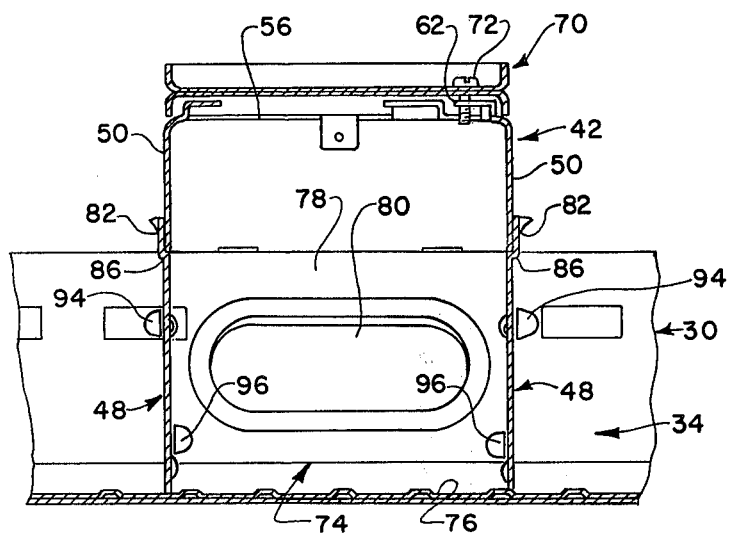
FIG. 5 is a fragmentary cross-sectional view taken along the line 5—5 of FIG. 3.
Figure 6:
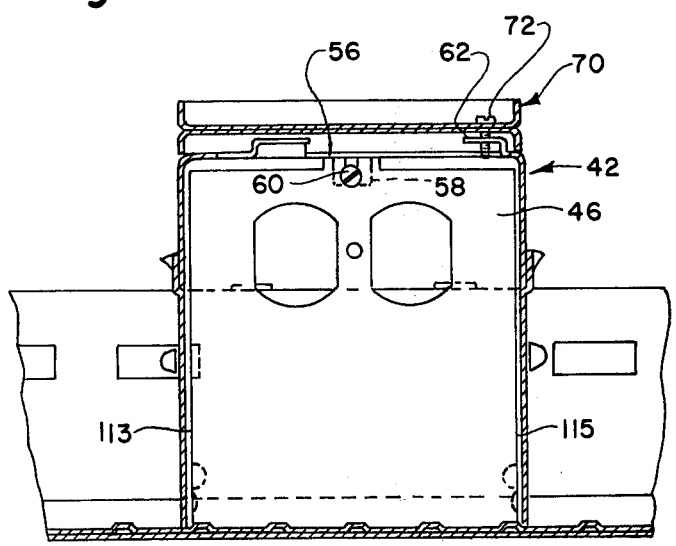
FIG. 6 is a cross-sectional view taken along the line 6—6 of FIG. 3.

Referring to FIGS. 4 to 6, cap means 70 is disposed in capping relation with respect to the dual outlet opening 56 to provide temporary protection against ingress of the concrete 24 (FIG. 4). The cap means 70 is secured to the access housing 42 by hold-down screws 72 (only one visible) threadedly engaged with the ears 62.

THE PRESENT IMPROVEMENT

In accordance with the present invention, one of the trough closures 48 is provided along each side of the access housing 42. As best shown in FIGS. 4 and 5, the trough closures 48 enclose a trough space 74 which is accessible through the dual outlet opening 56. The trough space 74 contains a valley segment 76 and confronting web segments 78. Each of the web segments 78 is provided with a grommetted web access opening 80 which establishes communication between each of the adjacent cells 30 and the trough space 74.

Figure 10:
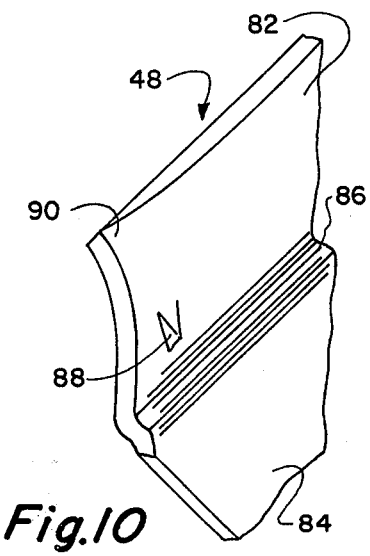
FIG. 10 is a fragmentary isometric view illustrating an upper corner portion of a trough closure.
Figure 7:
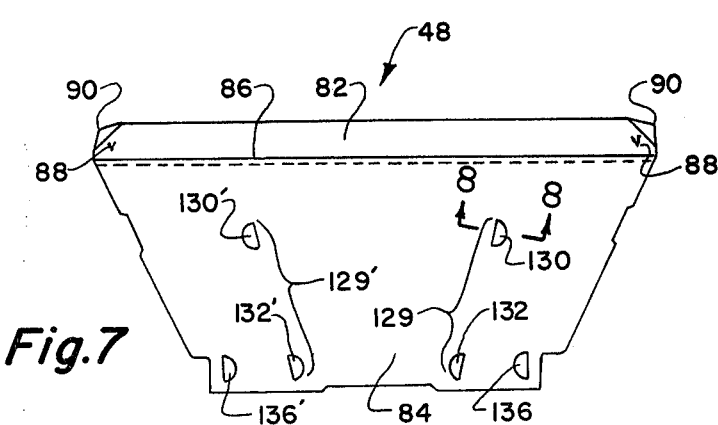
FIG. 7 is a front elevation view of a trough closure.

Referring to FIGS. 7 and 10, each trough closure 48 has an upper flange 82, a lower body portion 84 which is laterally offset from the upper flange 82, and a connecting strip 86. As best shown in FIG. 5, the upper flange 82 of each trough closure 48 overlaps a face, for example the exterior face of the housing side wall 50. The lower body portion extends below the access housing 42 into the trough 34. The connecting strip 86 extends laterally beneath a lower edge of the housing side wall 50. At least one tang 88 (FIGS. 7 and 10) may be provided in the upper flange 82 and positioned to extend into electrically grounded engagement with the housing side wall 50. The upper flange 82 of each trough closure is provided with at least one outwardly flared end portion 90 (FIGS. 7 and 10). The outwardly flared end portions 90 of both trough closures 48 provide a converging trough-like entrance which facilitates installation of the access housing 42 between the upper flanges 82.

Figure 11:
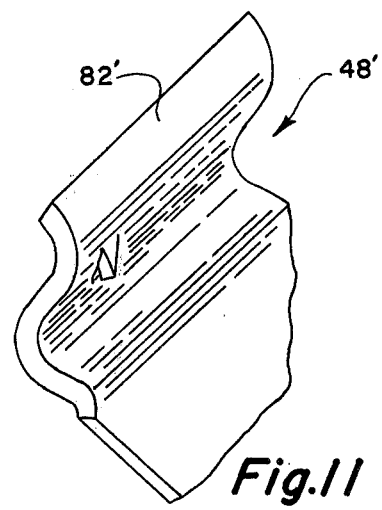
FIG. 11 is a fragmentary isometric view, similar to FIG. 10, illustrating an alternative upper flange configuration.

Alternatively, as shown in FIG. 11, a trough closure 48' may be provided having a generally S-shaped upper flange 82'. When installed, the upper portion of the flanges 82' flares outwardly from the access housing.

Figure 12:
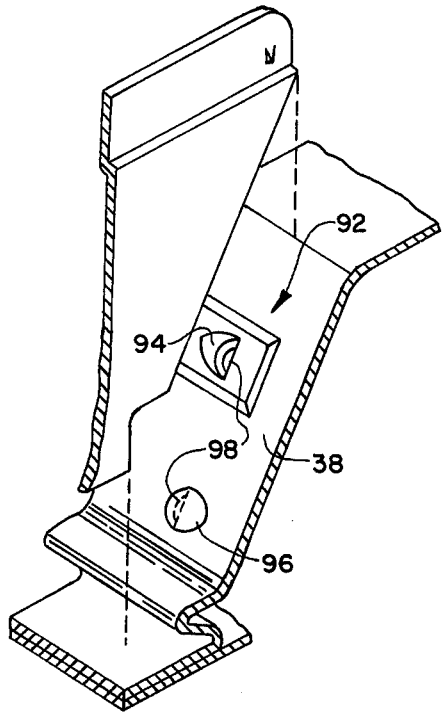
FIG. 12 is a fragmentary isometric view, partly in cross-section, illustrating retaining means for a trough closure.

Referring to FIG. 12, retaining means 92 is provided in each of the webs 38 (only one illustrated) for retaining each trough closure 48 in an upstanding position within the trough. The retaining means 92 may comprise upper and lower abutments 94, 96 presenting offset abutment surfaces 98. As best shown in FIG. 5, the abutments 94, 96 are positioned such that the abutment surfaces thereof are adjacent to each of the opposite faces of the trough closure 48. In the preferred arrangement, the upper abutments 94 are presented exteriorly of the trough space 74, and the lower abutments 96 are presented within the trough space 74. Thus arranged, the abutments 94, 96 maintain each of the trough closures 48 in an upstanding position within the trough 34; and the prevent displacement thereof from the upstanding position during installation of the access housing 42.

Figure 13:
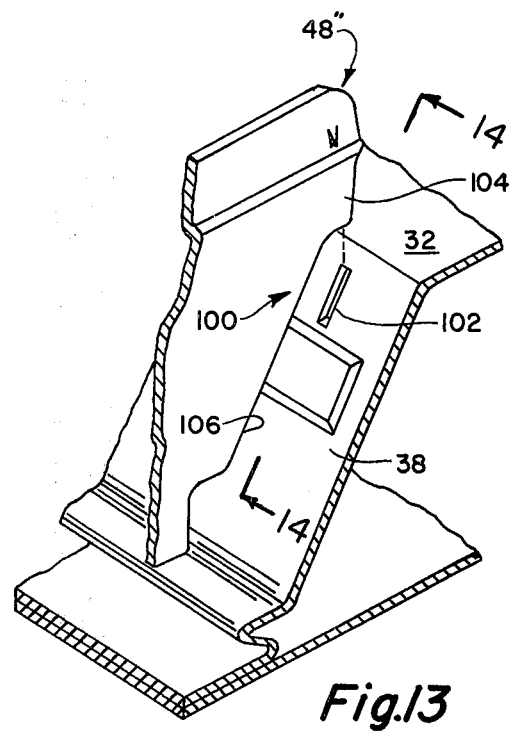
FIG. 13 is a fragmentary isometric view, partly in cross-section, illustrating alternative retaining means for a trough closure.
Figure 14:
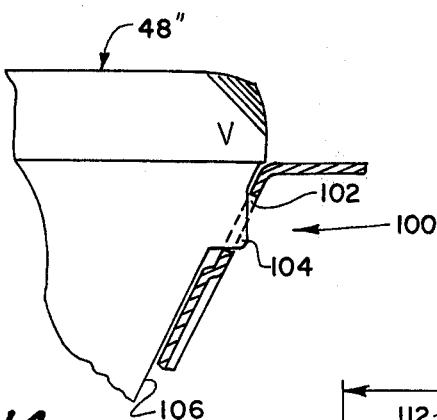
FIG. 14 is a fragmentary cross-sectional view taken along the line 14—14 of FIG. 13.

Alternatively, retaining means 100 (FIG. 13) may be provided comprising at least one slot 102 and a cooperating ear 104. The slot 102 is formed in the inclined web 38 at a level below the adjoining crest 32. The ear 104 extends from the inclined edge 106 of the trough closure 48''. When the trough closure 48'' is installed (FIG. 14), the ear 104 thereof extends into the slot 102.

Figure 15:
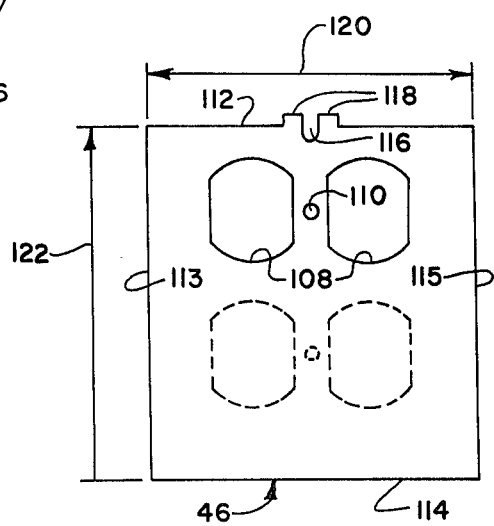
FIG. 15 is a front view of a partition.

The partition 46 (FIG. 15) is formed from light gauge sheet metal and is provided with at least one set of receptacle openings 108 and a fastener opening 110 by which a duplex receptacle may be secured to the partition 46. The partition 46 presents upper and lower edges 112, 114 and opposite edges 113, 115. A fastener slot 116 is presented between spaced tabs 118 formed in the upper edge 112. The partition 46 has a width indicated at 120 which is less than the partition height indicated at 122.

Figure 16:
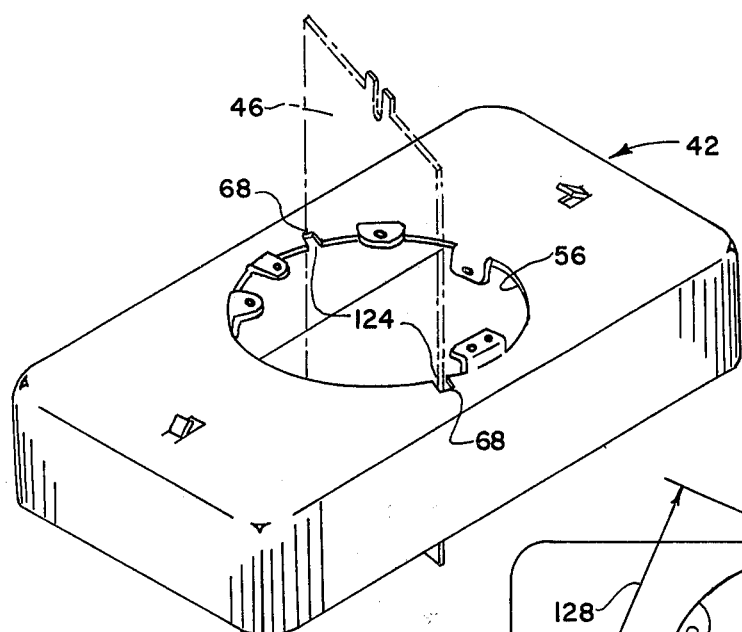
FIG. 16 is an isometric view of the present access housing, illustrating the introduction of a partition.
Figure 17:
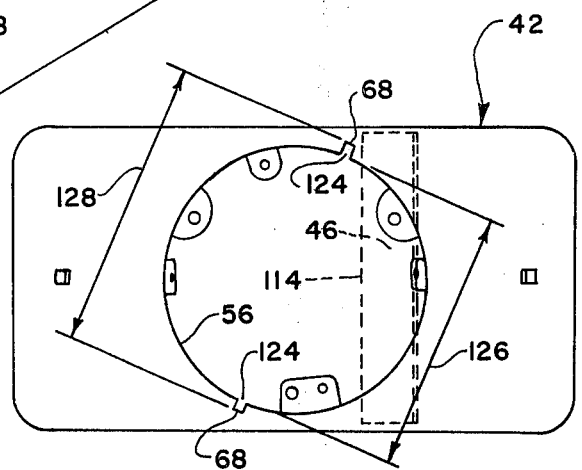
FIG. 17 is a plan view of the access housing of FIG. 16, illustrating dimensional relationships.

Referring to FIGS. 16 and 17, each of the notches 68 has an open end 124 presented at the periphery of the dual outlet opening 56. In the preferred arrangement, the notches 68 are diametrically opposed. It will be observed in FIG. 17 that the dual outlet opening 56 has an inner diameter, indicated at 126, which is less than that distance, indicated at 128, between the extreme outer ends of the notches 68. In the present arrangement, the partition width 120 (FIG. 15) is greater than the inner diameter 126 of the dual outlet opening 56 but less than the distance 128 between the opposite ends of the notches 68. Therefore, the notches 68 cooperate with the dual outlet opening 56 to provide through passage (distance 128) for a partition 46 having a minimum passing dimension (width 120) which is greater than the inner diameter 126 of the dual outlet opening 56. FIG. 16 illustrates the introduction of the partition 46 illustrated in dash-dot outline, into the notches 68 and the dual outlet opening 56.

A partition 46 is illustrated in dotted outline within the access housing 42 of FIG. 17. It will be observed that the notches 68 are positioned relative to the lower edge 114 of the previously installed partition 46, such that a second partition (not illustrated) may be introduced into the housing 42.

Figure 8:
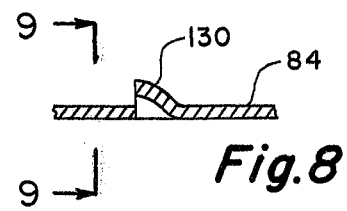
FIG. 8 is a cross-sectional view taken along the line 8—8 of FIG. 7.
Figure 9:
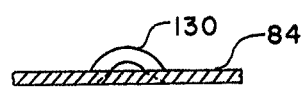
FIG. 9 is a cross-sectional view taken along the line 9—9 of FIG. 8.

Referring to FIGS. 4 and 6, the partition 46 is positioned such that an upper portion thereof is presented within the access housing 42 and a lower portion thereof is presented within the trough space 74. Means (fastener 60) is provided for securing the upper portion to one of the tabs 58 to the access housing 42. Edge receiving means 129 (FIG. 4) is provided for captively retaining the side edges 113, 115 (FIG. 5) of the lower portion of the partition 46. The edge receiving means 129 (FIGS. 7 to 9) may comprise a set of upper and lower abutments 130, 132, positioned such that one of the abutments 130, 132, is presented at each face of the partition 46, as best shown in FIG. 4. It will be observed in FIG. 7 that a second set of upper and lower abutments 130', 132' is formed in the trough closure 48, and cooperate with the tab 58' (FIG. 4) of the access housing 42 in positioning a second partition (not illustrated).

Figure 18:
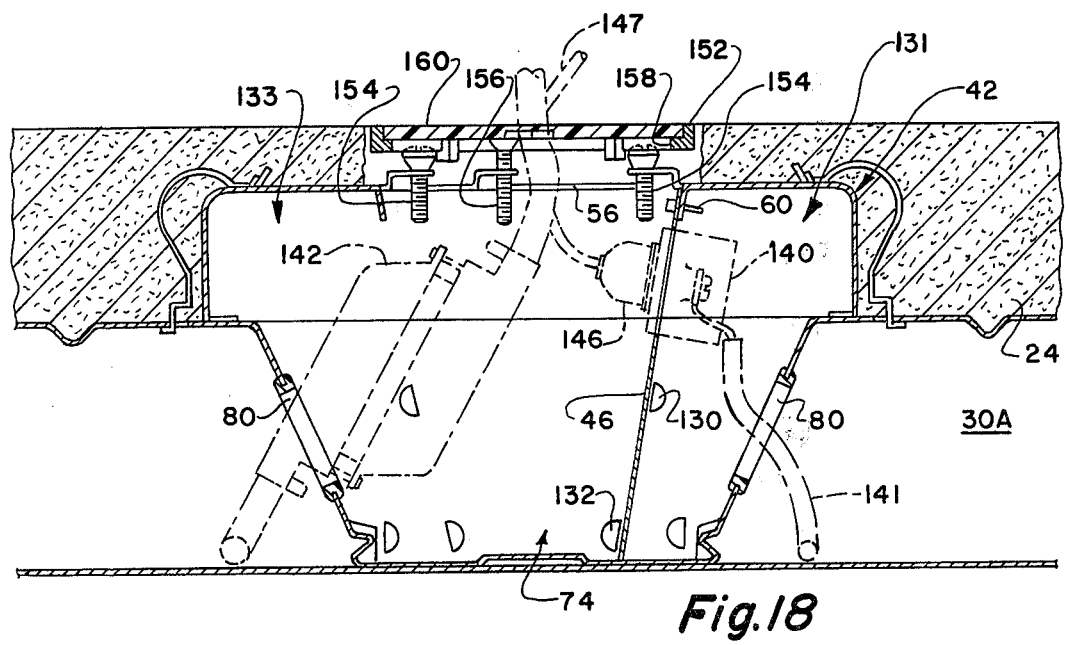
FIG. 18 is a fragmentary cross-sectional view of a finished floor structure as viewed from the line 18—18 of FIG. 2.

Referring to FIG. 18, the upper and lower abutments 130, 132 cooperate with the fastener 60 to retain the partition 46 in a first position. Thus positioned, the partition 46 divides the interior of the trough space 74 and the interior of the access housing 42 into separate chambers 131, 133, each containing one of the web access openings 80, and one, for example the chamber 133, containing the dual outlet opening 56.

Referring to FIG. 19, second edge receiving means 134 also is provided for captively retaining the lower portion of the partition 46. The second edge receiving means comprises an abutment 136 presented by each of the trough closures 48, and an inclined web portion, such as a longitudinal rib 138, which extends into the trough space 74 and confronts the abutment 136. The longitudinal rib 138 is formed in the cellular flooring unit 28 at the intersection of the valley 36 and the adjoining inclined web 38. It will be observed in FIG. 19 that the fastener 60 and the second edge receiving means 134 retain the partition 46 in a second position, wherein a relatively larger chamber 133' and a relatively smaller chamber 131' are provided, compare FIGS. 18 and 19.

Referring again to FIG. 18, it will be observed that a duplex receptacle illustrated in dash-dot outline at 140 is carried by the partition 46 and resides in the chamber 131. A power cable 141 connected to the receptacle 140 extends through the grommetted opening 80 into the adjacent cell 30A. An electrical plug 146 is connected to the receptacle 140 and provides electrical power to the space above the floor by way of the cord 147. A telephone cable connector unit illustrated in dash-dot outline at 142 is housed within the larger chamber 133.

In the arrangement illustrated in FIGS. 19 and 20, the larger chamber 133' houses a multiple telephone cable connector unit 144. The unit 144 extends partly through the grommetted opening 80 and includes plural supply cables 148 extending through the cell 30B, and a single outlet cable 150 providing telephonic signals to the space above the floor structure 20.

Referring again to FIG. 18, the dual outlet opening 56 is provided with a flush floor fitting which may comprise a finishing ring 152. Leveling screws 154 support the finishing ring 152 in flush relation with the upper surface of the concrete 24. Hold-down screws 156 (only one visible) secure the finishing ring 152 to the access housing 42. The finishing ring 152 has an outlet opening 158 which receives a plastic cover 160.

Referring to FIG. 21 through 24, the cover 160 may be formed of plastic, as two identical cover segmets 162 having butted edges 164 (FIG. 21). The edge 164 of each cover segment 162 (FIGS. 21, 22) presents alternating tongues 166 and complementary grooves 168. When assembled, the two cover segments 162 are connected by tongue and groove connections 170, see FIG. 23.

Figure 23:
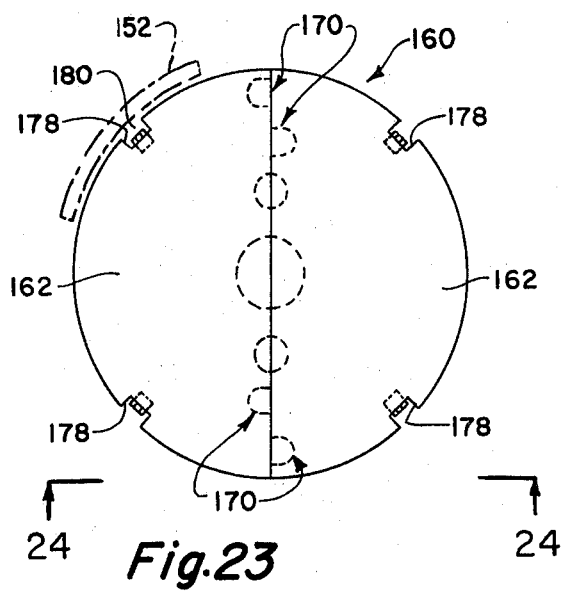
FIG. 23 is a plan view of a cover assembled from a pair of the cover segments of FIG. 21.

Each of the segments 162 is provided, at its butted edge 164, with a central semi-cylindrical well 172 and semi-cylindrical wells 174 on opposite sides thereof, see FIGS. 21, 22. Each of the wells 172, 174 includes a thin cover 176 (FIG. 22). As best shown in FIG. 23, the semi-cylindrical wells cooperate to provide cylindrical wells which, when the thin cover 176 (FIG. 22) is removed, provide openings in the plastic cover 160 through which electrical conductors may pass to the level above the floor structure 20, as shown in FIGS. 18 and 19.

Rim notches 178 (FIG. 23) are provided at angularly spaced-apart locations, e.g., 90° apart, in the periphery of each segment 162. Each rim notch 178 cooperates with the finishing ring 152 (shown in dash-dot outline) to provide a recess 180. The cover 160 may be removed from the finishing ring 152 by inserting a tool, such as a screw driver, into one of the recesses 180 and prying the cover 160 loose.

Figure 24:
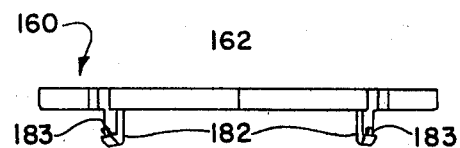
FIG. 24 is a side view of the cover as viewed from the line 24—24 of FIG. 23.

The segments 162 are provided with legs 182 having hooked ends 183, see FIGS. 22, 24. The legs 182 preferably are located at the rim notches 178. The legs 182 engage the finishing ring 152 and thereby detachably retain the cover 160 within the outlet opening 158, see FIG. 19.

Figure 25:
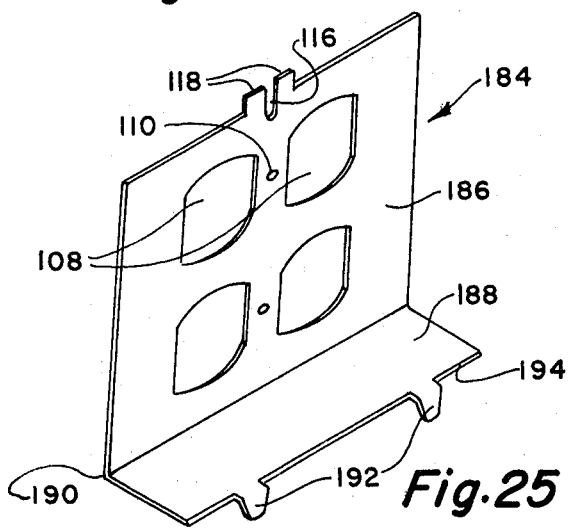
FIG. 25 is an isometric view of an alternative partition.

FIG. 25 illustrates an alternative partition 184; a generally upright body portion 186; a lateral flange 188 adjoined to the lower edge 190 of the body portion 186; and spaced-apart fingers 192 extending downwardly from the free edge 194 of the flange 188. The partition 184 is provided with at least one set of receptacle openings 108, a fastener opening 110, and fastener slot 116 disposed between the tabs 118.

Figure 27:
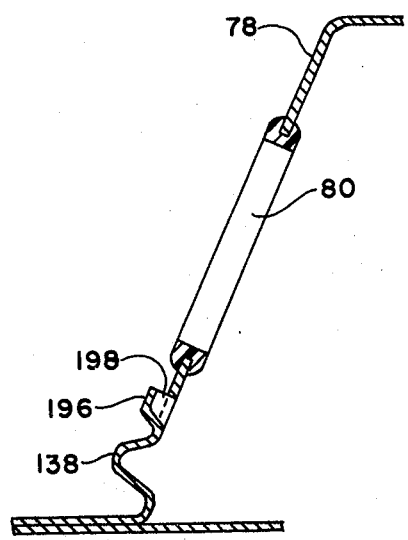
FIG. 27 is a cross-sectional view, taken along the line 27—27 of FIG. 26.
Figure 26:
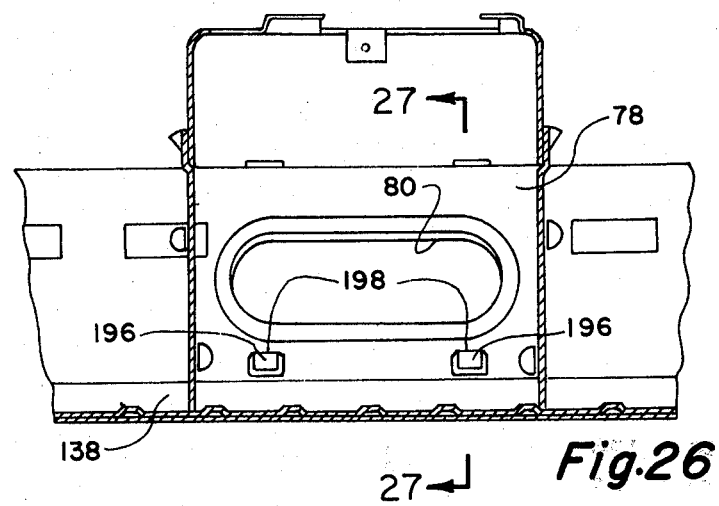
FIG. 26 is a cross-sectional view, similar to FIG. 5, illustrating alternative edge retaining means.
Figure 28:
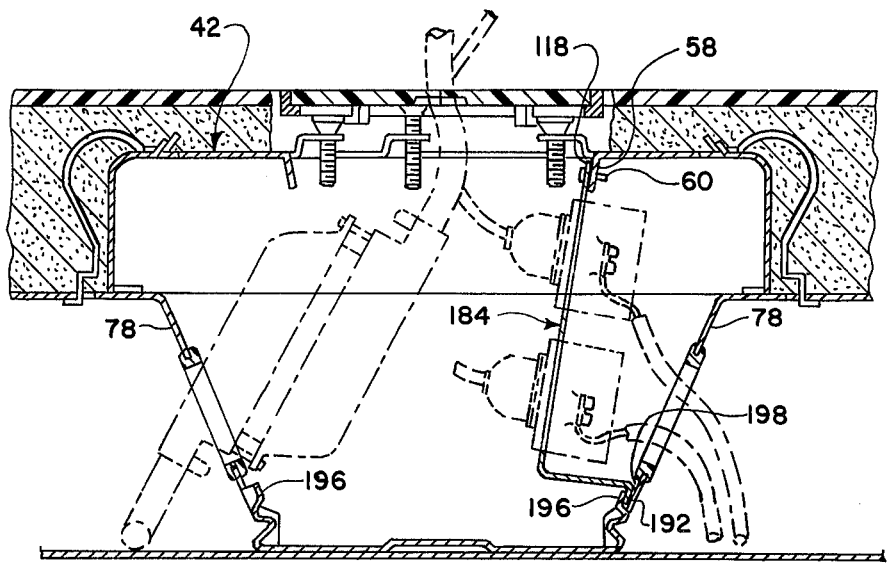
FIG. 28 is a cross-sectional view, similar to FIG. 18, illustrating the alternative partition of FIG. 25 installed in the housing means of FIG. 26.

It will be observed in FIGS. 26 and 27 that inclined web segment 78 is provided with spaced-apart cup-like embossments 196, each presenting an opening 198 (FIG. 27). The embossments 196 are formed in that region of the web segment 78 disposed beneath the grommetted opening 80 and above the longitudinal rib 138. The distance between the openings 198 matches that of the partition fingers 192 (FIG. 25). When installing the partition 184 (FIG. 28), the fingers 192 are engaged in the openings 198. Thereafter, the partition is pivoted counterclockwise, as viewed in FIG. 28, to engage the partition ears 118 of the tab 58. The fastener 60 secures the partition 184 to the access housing 42.

The present invention also provides an improved floor structure having increased fire resistance. Broadly, the improved floor structure may be defined as the type having a layer of monolithic concrete as the major weight component of the floor structure — the concrete having an upper surface and a lower surface; a cavity within the concrete which extends from the upper surface through the lower surface; passageway means within the cavity for surrounding electrical wiring; and a quantity of fireproofing material disposed within the cavity and having a volume which is a minor fraction of the volume of the cavity, the fireproofing material being of the type adapted to yield, under fire conditions, a stable incombustible mass which seals the cavity against passage of heat and smoke. The quantity of fireproofing material employed may be such that the resulting incombustible mass substantially entirely fills all voids in the cavity.

Figure 30:
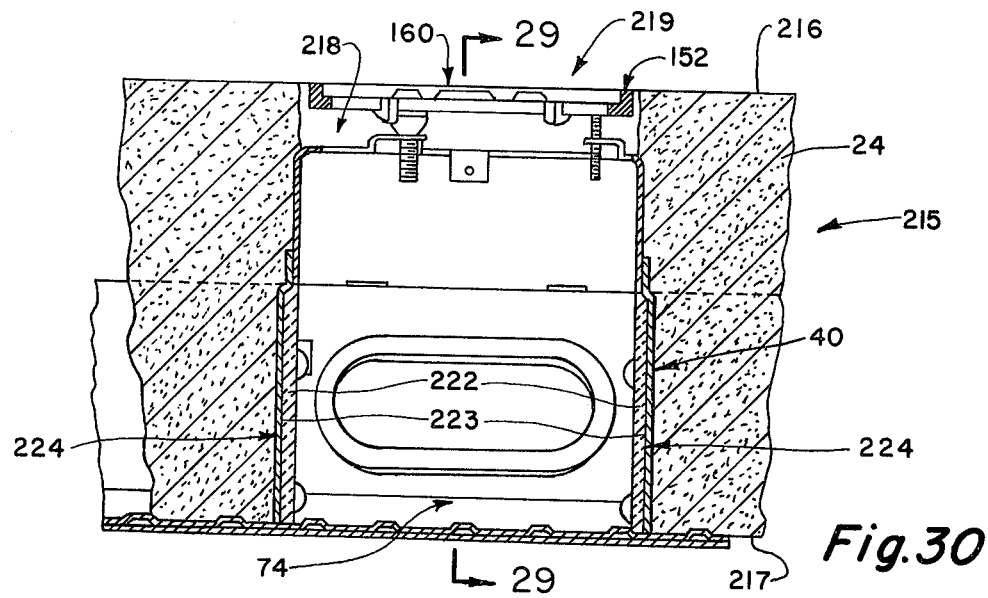
FIG. 30 is a cross-sectional view taken along the line 30—30 of FIG. 29.
Figure 29:
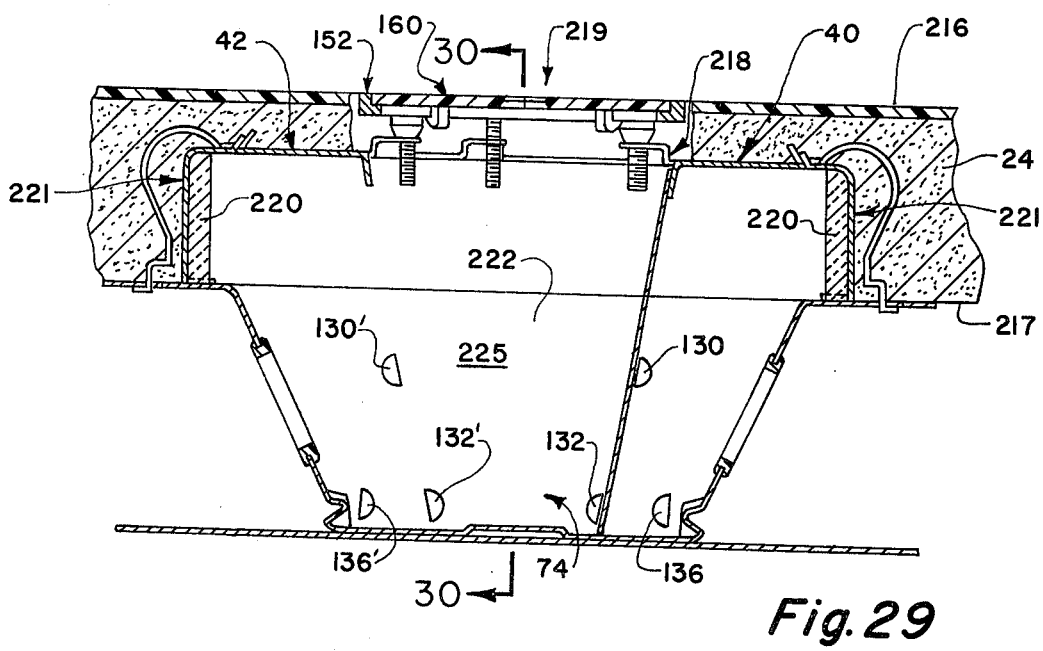
FIG. 29 is a cross-sectional view, taken along the line 29—29 of FIG. 30, illustrating an access housing arrangement incorporating fireproofing material.

With the foregoing definition in mind, it will be observed in the floor structure 215 of FIGS. 29 and 30 that the concrete 24 presents an upper surface 216 and a lower surface 217. A cavity 218 formed in part by the present access housing means 40, extends from the upper surface 215 through the lower surface 217. Passageway means, herein comprising the access housing means 40, is disposed within the cavity 218 for surrounding electrical wiring (not illustrated). Means 219, herein comprising the finishing ring 152 and the plastic cover 160, provides access to the cavity 218 and the interior of the access housing means 40 from the upper surface 216 of the floor structure 215. Unobtrusive layers 220 (FIG 29) of fireproofing material are disposed in the opposite end portions 221 of the access housing 42. Unobtrusive layers 222 (FIG. 30) of fireproofing material are applied to the interior faces 223 of the trough closures 224. It will be observed in FIG. 29 that the embossments 130, 132 and 136 may be integrally formed in and extend from layer faces 225 (only one visible) of the unobtrusive layers 222.

It will be observed in FIGS. 29 and 30 that the quantity of fireproofing material constituting the layers 220 and 222 has a volume which is a minor fraction of the volume of the cavity 218, i.e., the combined volumes of the access housing 42 and the trough space 74.

The fireproofing layers 220 and 222 are formed from an incombustible, thermally expandable material which is adapted to yield, under fire conditions, a stable incombustible mass which seals the cavity 218 against through passage of heat and smoke. That is, the stable incombustible mass yielded by the expansion of the layers 220, 222 surrounds and encases any electrical connector elements and wiring, such as the telephone cable connectors 142, 144, the duplex receptacle 140 and the associated wiring illustrated in FIGS. 18 and 19, contained within the interior of the access housing means 40.

A suitable material for the layers 220, 222 is a glass-ceramic foam producing material sold under the name FP100 by Pittsburgh Corning Corporation. On expansion, the FP100 produces a stable, void filling, glass-ceramic foam.

FIGS. 31, 32 illustrate a further alternative arrangement wherein a floor structure 226 includes access housing means 227 which incorporates trough closures 228 formed of an incombustible thermally expandable material. Each of the trough closures 228 (FIG. 33) presents an upper portion 229 having a generally vertical, longitudinal slot 230. The upper portion 229 presents opposite end portions 231 which extend beyond the opposite sides 232 (only one visible) of the lower body portion 233. Each of the trough closures 228 may be encased in a protective coating 234. The layers 220 of fireproofing material (FIG. 31) may each be encased in a similar protective coating, a fragment of which is illustrated at 235 in FIG. 32. The protective coatings 234, 235 prevent degradation of the fireproofing material by contact with liquids contained in the concrete 24. The protective coatings 234, 235 may comprise a water impervious material which is easily ruptured during thermal expansion of the fireproofing material 220, 228.

It will be observed in FIG. 31 that the opposite ends 231 of the trough closures 228 overlie the spaced crests 32. When the housing 42 is installed, the opposite side walls 50 thereof are received in the longitudinal slots 230 (FIG. 32). Each of the layers 220 of fireproofing material (FIG. 31) extends below the bottom edges 236 of the housing side walls 50 and end walls 52, whereby the housing 42 is maintained vertically spaced-apart from the flooring unit 28.

It will be observed in FIGS. 31, 32 that the layer of concrete 24 has an upper surface 216 and a lower surface 217; and that a cavity 237 within the layer of concrete 24, extends from the upper surface 216 through the lower surface 217. The passageway means (access housing means 227) resides within the cavity 237 and is formed partly from metal and partly from fireproofing material. The arrangement illustrated in FIGS. 31, 32 includes all of the advantages herein above described with respect to the embodiment illustrated in FIGS. 29 and 30. The embodiment illustrated in FIGS. 31, 32 has the added advantage in that the housing 42 is vertically spaced-apart from the flooring unit 28, whereby thermal wicking (heat flow by conduction) is greatly reduced.

Figure 35:
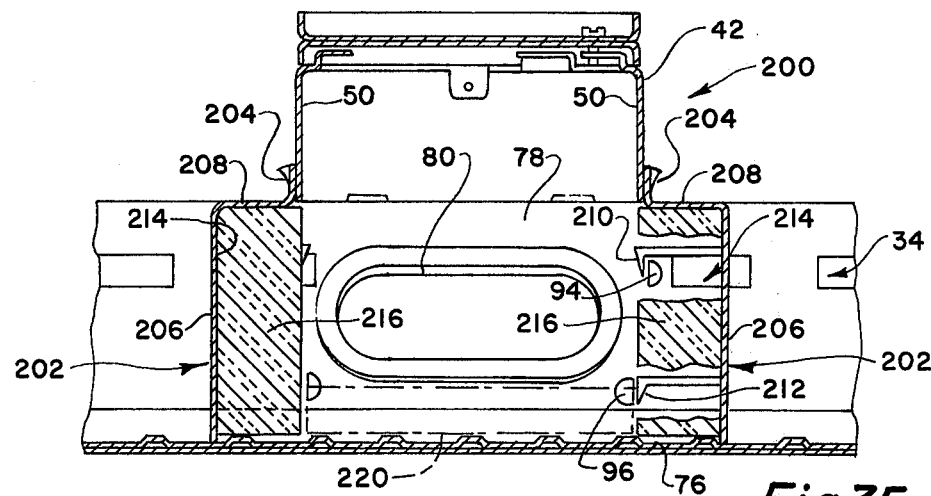
FIGS. 34 and 35 are cross-sectional views similar to FIGS. 29, 30, illustrating a further fireproofing arrangement.
Figure 34:
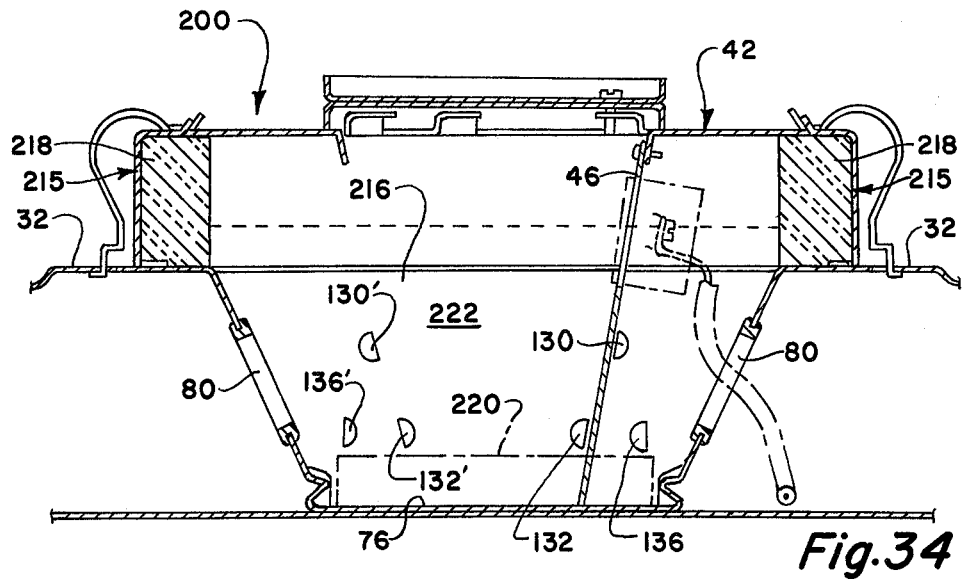

Reference is now directed to FIGS. 34 and 35 wherein an alternative embodiment of the present enclosure means is illustrated and designated generally by the numeral 200. In this embodiment, each of the trough closures 202 includes an upper flange 204 confronting the housing side wall 50, a lower body portion 206 which is outwardly offset from the upper flange 204, and a connecting web 208. Each trough closure 202 presents an upper hook 210 and a lower arm 212 formed integrally with each of the opposite sides of the lower body portion 206. The hook 210 is hooked over the abutment 94 while the arm 212 engages the lower abutment 96, whereby each trough closure 202 is retained in an upright position within the trough 34. It will be observed in FIG. 35 that the connecting web 208 and the lower body portion 206 of each of the trough closures 202 cooperate with the adjacent valley segment 76 and the confronting web segment 78 to define spaces 214. Each of the spaces 214 receives a fireproofing material 216. As best shown in FIG. 34, the opposite end portions 215 of the access housing 42 which overlie the crests 32 also receive fireproofing material 218. If desired, fireproofing material illustrated in dash-dot outline at 220 may be provided over the valley segment 76, between the fireproofing material 216 and at a level beneath the grommetted openings 80.

As best shown in FIG. 34, the previously described abutments 130, 132 and 136 may be formed integrally in the interior face 222 of each fireproofing material 216. The abutments 130, 132 and 136 serve to position the partition 46 as described above.

The fireproofing material 216, 218 may comprise a thermally expandable material having an expansion ratio which is less than that of the fireproofing material 220, 222 of FIGS. 29, 30.

We claim:
1. In an electrical wiring distributing floor structure including cellular flooring units providing generally parallel enclosed cells, each pair of adjacent cells presenting spaced crests separated by a trough, each said trough comprising a valley and confronting inclined webs connecting said valley to said spaced crests, an access housing fixed to the flooring unit and spanning the distance between said spaced crests, said access housing having perimeter walls, and a top wall provided with an outlet opening, the improvement comprising:
   distinct trough closures, one positioned along each side of said access housing and cooperating with a valley segment and confronting web segments to define a trough space accessible through said outlet opening; and
   each of said confronting web segments having a web access opening establing communication between each cell of said adjacent cells and said trough space.
2. The improvement of claim 1 wherein each of said web access openings has opposite ends inwardly spaced-apart from said trough closures.
3. The improvement of claim 1, including
   a partition having an upper portion residing within said access housing and a lower portion residing within said trough space, said partition dividing said trough space and the interior of said access housing into separate chambers each containing one of said web access openings, and one containing said outlet opening;
   means securing said upper portion to said access housing; and
   edge receiving means captively retaining said lower portion.
4. The improvement of claim 3 wherein said edge receiving means is formed in confronting faces of said trough closures.

5. The improvement of claim 3 wherein said edge receiving means comprises
abutments, one presented by each of said trough closures; and
an inclined web portion extending into said trough space and confronting said abutments.

6. The improvement of claim 5 wherein said inclined web portion comprises
a longitudinal rib formed in said cellular flooring unit at the intersection of said valley and the adjoining inclined web, said rib extending into said trough space and confronting said abutments.

7. The improvement of claim 3 wherein said edge receiving means is formed in confronting faces of said trough closures, and including
second edge receiving means disposed between the first said edge receiving means and one of said inclined web segments, said second edge receiving means comprising:
abutments, one presented by each of said trough closures; and
an inclined web portion extending into said trough space and confronting said abutments;
whereby said partition may be retained in either of two alternative positions within said trough space and said access housing.

8. The improvement of claim 3 wherein said top wall has notches presented on opposite sides of said outlet opening, each of said notches having an open end at the periphery of said outlet opening, said notches cooperating with said outlet opening to provide through passage for a partition having a minimum passing dimension which is greater than the inner diameter of said outlet opening.

9. The improvement of claim 8 wherein said notches are diametrically opposed.

10. The improvement of claim 3 including
a layer of fireproofing material covering the interior face of each of said trough closures;
said edge receiving means being formed in each said layer of fireproofing material.

11. The improvement of claim 1 wherein each of said trough closures is formed of an incombustible thermally expandable material which is adapted to yield, under fire conditions, a stable incombustible mass which seals said trough space against passage of heat and smoke.

12. The improvement of claim 1, including
a partition having an upper portion within said access housing and a lower portion within said trough space, said lower portion including a flange extending toward one web segment;
means securing said upper portion to said access housing; and
means pivotally connecting said flange to said one web segment;
said partition dividing said trough space and the interior of said access housing into separate chambers, each containing one of said web access openings, and one containing said outlet opening.

13. The improvement of claim 12, wherein said means for pivotally connecting comprises:
spaced-apart openings formed in said one web segment beneath the web access opening thereof; and
fingers extending from said flange and engaged with said openings.

14. The improvement of claim 1 including retaining means within said trough for retaining each of said trough closures in an upstanding position.

15. The improvement of claim 14, wherein said retaining means for each trough closure comprises
slots, at least one formed in each of said inclined webs at a level below the adjoining crests; and
ears extending from the trough closure into said slots.

16. The improvement of claim 14, wherein said retaining means for each trough closure comprises
abutments formed in each of said confronting web segments adjacent to each of the opposite faces of the trough closure.

17. The improvement of claim 1 wherein each said trough closure includes
an upper flange overlapping a face of one side wall of said access housing; and
at least one tang extending from said upper flange into electrically grounded engagement with said one side wall.

18. The improvement of claim 1 wherein each trough closure includes:
an upper flange overlapping a face of one side wall of said access housing and having at least one outwardly flared end portion,
the outwardly flared end portions of both the trough closures facilitating entry of said access housing between the upper flanges of said trough closures.

19. The improvement of claim 1 including
fireproofing material disposed in opposite end portions of said access housing.

20. The improvement of claim 19, wherein said fireproofing material comprises an unobtrusive quantity of a thermally expandable material adapted to yield, under fire conditions, a stable incombustible mass which substantially entirely fills all voids in said access housing.

21. The improvement of claim 20 including
additional fireproofing material applied to the interior face of each of said trough closures, said additional fireproofing material comprising an unobtrusive quantity of a thermally expandable material adapted to yield, under fire conditions, a stable incombustible mass which substantially entirely fills all voids in said trough space.

22. The improvement of claim 1, including
fireproofing material applied to the interior face of each of said trough closures.

23. The improvement of claim 22, wherein said fireproofing material comprises an unobtrusive quantity of a thermally expandable material adapted to yield, under fire conditions, a stable incombustible mass which substantially entirely fills all voids of said trough space.

24. The improvement of claim 1 wherein each of said trough closures comprises:
an upper flange overlapping a face of one perimeter wall of said access housing;
a lower body portion extending below said access housing and being laterally offset with respect to said upper flange; and
a connecting strip joining said upper flange to said lower body portion.

25. The improvement of claim 24, wherein
said lower body portion is substantially coplanar with said one perimeter wall; and
said connecting strip confronts a lower edge of said one perimeter wall.

26. The improvement of claim 24, wherein
said lower body portion is generally parallel with and outwardly spaced from said one perimeter wall; and including
fireproofing material filling the space defined by said connecting strip, said lower body portion, and those portions of the valley and confronting web segments adjacent thereto.

27. The improvement of claim 26, including
additional fireproofing material disposed in opposite end portions of said access housing.

28. The improvement of claim 27, including
additional fireproofing material disposed within said trough space, overlying that portion of said valley segment extending between that fireproofing material covering said trough closures, and residing beneath said web access openings.

29. In the combination of an electrical access housing and at least one partition for dividing the interior of said housing into separate chambers, said access housing including a top wall provided with an outlet opening, the improvement comprising:
said partition having a minimum passing dimension which is greater than the inner diameter of said outlet opening, and
said top wall having notches presented on opposite sides of said outlet opening, each of said notches having an open end at the periphery of said outlet opening, said notches cooperating with said outlet opening to provide through passage for said partition.

30. The improvement of claim 29, wherein said notches are diametrically opposed.

31. In an electrical wiring distributing floor structure including cellular flooring units providing generally parallel enclosed cells, each pair of adjacent cells presenting spaced crests separated by a trough, each said trough comprising a valley and confronting inclined webs connecting said valley to said spaced crests, an access housing spanning across one trough and having opposite end portions overlying and secured to said spaced crests, said access housing having opposite side walls, opposite end walls, and a top wall provided with an outlet opening, the improvement comprising:
distinct trough closures, one positioned along each side of said access housing and enclosing a trough space accessible through said outlet opening, said trough space containing a valley segment and confronting web segments; and
each of said confronting web segments having a web access opening establishing communication between each cell of said adjacent cells and said trough space.

32. In an electrical wiring distributing floor structure including cellular flooring units providing generally parallel enclosed cells, each pair of adjacent cells presenting spaced crest separated by a trough, each said trough comprising a valley and confronting inclined webs connecting said valley to said spaced crests, an access housing fixed to the flooring unit and spanning the distance between said spaced crests, said access housing having perimeter walls, and a top wall provided with an outlet opening, the improvement comprising:
distinct trough closures, one positioned along each side of said access housing and cooperating with a valley segment and confronting web segments to define a trough space accessible through said outlet opening;
each of said confronting web segments having a web access opening establishing communication between each cell of said adjacent cells and said trough space; and
a quantity of fireproofing material disposed within said access housing in unobstructing relation therewith and adapted to yield, under fire conditions, an incombustible mass which substantially entirely fills all voids in said access housing.

33. The improvement of claim 32 wherein said incombustible mass comprises a glass ceramic foam.

34. The improvement of claim 32 including
a quantity of fireproofing material disposed within said trough space such that the web access openings are unobstructed by said fireproofing material, said fireproofing material being adapted to yield, under fire conditions, a stable incombustible mass which substantially entirely seals all voids in said trough space.

35. The improvement of claim 34 wherein each said incombustible mass comprises a glass ceramic foam.

36. In an electrical wiring distributing floor structure including cellular flooring units providing generally parallel enclosed cells, each pair of adjacent cells presenting spaced crests separated by a trough, each said trough comprising a valley and confronting inclined webs connecting said valley to said spaced crests, an access housing fixed to the flooring unit and spanning the distance between said spaced crests, said access housing having perimeter walls, and a top wall provided with an outlet opening, the improvement comprising:
distinct trough closures, one positioned along each side of said access housing and cooperating with a valley segment and confronting web segments to define a trough space accessible through said outlet opening;
each of said confronting web segments having a web access opening establishing communication between each cell of said adjacent cells and said trough space; and
a quantity of fireproofing material disposed within said trough space such that the web access openings are unobstructed by said fireproofing material, said fireproofing material being adapted to yield, under fire conditions, a stable incombustible mass which substantially entirely seals all voids in said trough space.

37. The improvement of claim 36 wherein each said incombustible mass comprises a glass ceramic foam.

* * * * *